United States Patent [19]
Wentworth et al.

[11] Patent Number: 6,133,181
[45] Date of Patent: Oct. 17, 2000

[54] MIXTURE FOR USE IN VACUUM FORMING ARTICLES OF CERAMIC FIBERS

[76] Inventors: Bryce T. Wentworth, 1406 Skyline Dr., #R-104, Johnson City, Tenn. 37604; David Messina, 165 Tucker La., Johnson City, Tenn. 37601; Arthur A. Corry, 6832 Trail Blvd., Naples, Fla. 34108

[21] Appl. No.: 08/882,375

[22] Filed: Jun. 25, 1997

[51] Int. Cl.[7] .................................................. C04B 13/00
[52] U.S. Cl. ........................ 501/95.1; 106/600; 206/219; 206/811
[58] Field of Search ........................... 501/95.1; 106/606, 106/644, 711, 797; 206/219, 568, 528, 806, 811; 252/70, 71, 74

[56] References Cited

U.S. PATENT DOCUMENTS

| | | | |
|---|---|---|---|
| 3,629,116 | 12/1971 | Gartner et al. | 252/62 |
| 4,040,847 | 8/1977 | Miiller . | |
| 4,174,331 | 11/1979 | Myles . | |
| 4,248,752 | 2/1981 | Myles . | |
| 5,053,362 | 10/1991 | Chi et al. . | |
| 5,223,138 | 6/1993 | Zievers et al. | 264/62 |
| 5,224,595 | 7/1993 | Sugimoto et al. . | |
| 5,552,213 | 9/1996 | Eschner . | |
| 5,595,816 | 1/1997 | Carswell | 428/131 |
| 5,612,266 | 3/1997 | Delvaux et al. | 501/123 |
| 5,691,259 | 11/1997 | Couture et al. | 501/127 |
| 5,723,821 | 3/1998 | Olsen et al. | 428/357 |

FOREIGN PATENT DOCUMENTS

| | | |
|---|---|---|
| 53-046324 | 4/1978 | Japan . |
| 55-014839 | 4/1980 | Japan . |
| 58-017151 | 4/1983 | Japan . |
| 59-199567 | 11/1984 | Japan . |
| 60-255681 | 12/1985 | Japan . |
| 401042373 | 2/1989 | Japan . |
| 401207116 | 8/1989 | Japan . |
| 406279138 | 10/1994 | Japan . |
| 08283076 | 10/1996 | Japan . |
| 09301780 | 11/1997 | Japan . |
| 410458 | 1/1976 | Spain . |
| WO 9837035 | 8/1998 | WIPO . |

*Primary Examiner*—Paul Marcantoni
*Attorney, Agent, or Firm*—Merrill N. Johnson

[57] ABSTRACT

A mixture of granulated particles comprising ceramic fibers sized to pass through a screen having an opening measuring not more than ¾ of an inch, a binder of colloidal silica, and water are mixed to form a granulated mixture. The ceramic fibers comprise 68.3 wt % of the mixture, colloidal silica comprises 7.5 wt %, and water comprises 24.2 wt % of the mixture. Further, the mixture may be encased in a moisture-proof bag for storage and shipping.

2 Claims, 1 Drawing Sheet

MIXTURE FOR USE IN VACUUM FORMING ARTICLES OF CERAMIC FIBERS

FIELD OF INVENTION

Our invention lies in the field of vacuum forming articles made of ceramic fibers such as gas heated fireplace logs which can withstand temperatures exceeding 1250° F.

BACKGROUND OF THE INVENTION

For over twenty years manufacturers of dry ceramic fibers have been supplying dry ceramic fibers to companies which mass produce articles such as fireplace logs by vacuum forming. The dry ceramic fibers in various lengths are shipped to the vacuum forming companies from the ceramic fiber manufacturers in bags usually weighing about 50 pounds. The vacuum former must then open the bags, empty the bags into a vat and chop the dry ceramic fibers into short lengths which will pass through an appropriately sized screen, an environmentally hazardous operation.

The dry chopped ceramic fibers are then rapidly mixed in an open vat with water and various fillers to form an organic or inorganic slurry which is subsequently vacuum formed into articles composed mainly of chopped ceramic fibers which can withstand temperatures exceeding 1250° F. without decomposition or deformation of the article.

SUMMARY OF THE INVENTION

Briefly put, our invention consists of chopping dry ceramic fibers into small particles which will pass through an appropriately sized screen and then treating a mass of the chopped ceramic fibers with a liquid binder preferably water containing colloidal silica suspended in water. The resulting mixture is thoroughly mixed to form moist granules eventually to be used by vacuum formers to produce the slurry used to vacuum form articles.

To preserve the moisture content of the mixture until use of the mixture, preferably 40 pound lots of the mixture are stored and shipped to the vacuum formers in moistureproof bags.

The vacuum former now has merely to open the bag, pour the moist mixture into a vat equipped with one or more high speed mixers and containing a measured quantity of a liquid binder preferably 75% water and 25% colloidal silica at 40% dispersion grade, turn on the mixers and produce the desired slurry without going through the previous environmentally hazardous and costly steps of opening bags of dry ceramic fibers, chopping the dry fibers into small lengths, passing the chopped fibers through the desired size mesh screen, and depositing the chopped fibers and measured amounts of a binder and water into the vat to be mixed and formed into the slurry.

DETAILED DESCRIPTION OF A PREFERRED EMBODIMENT

Figure 1:
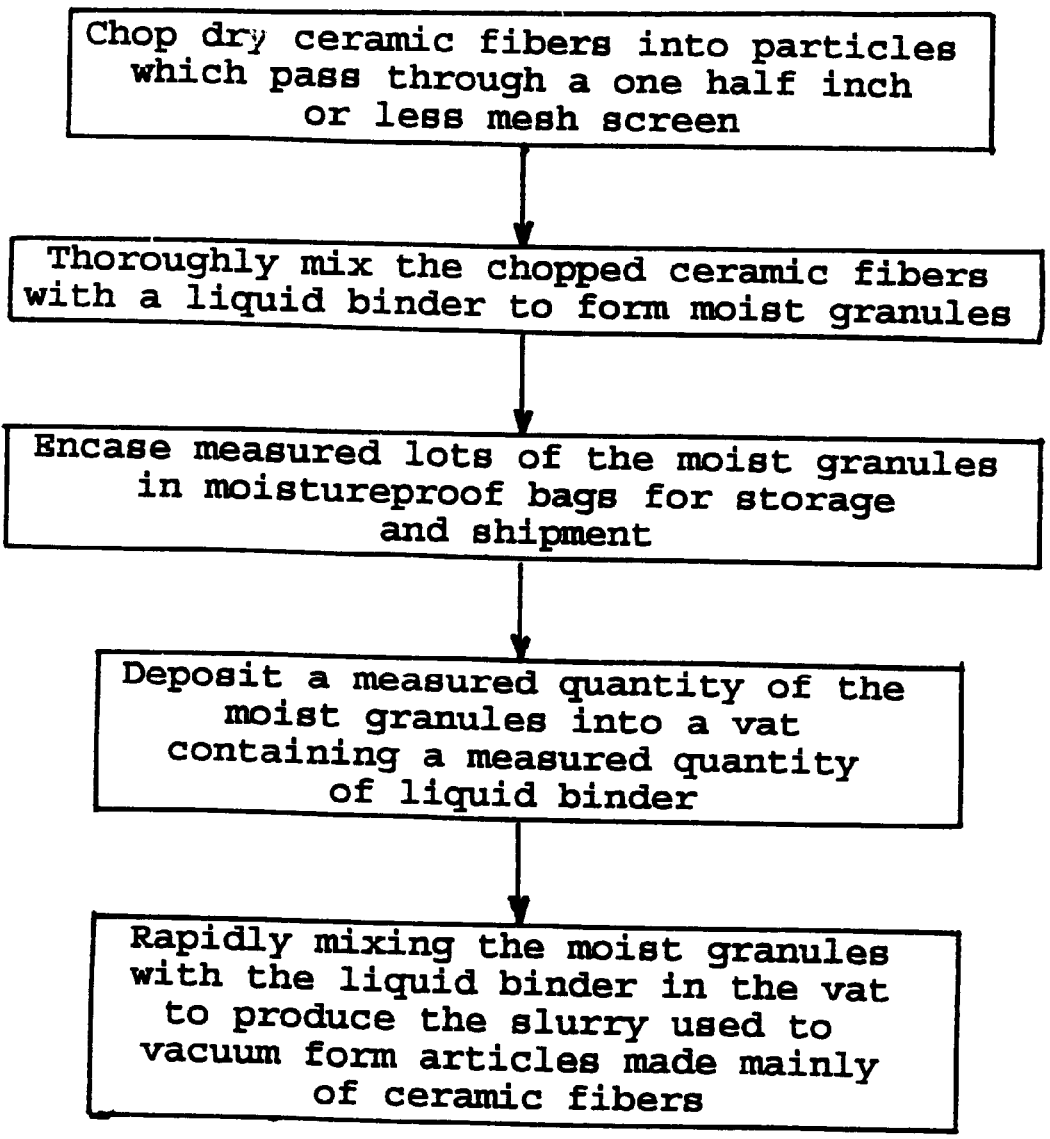
FIG. 1 is a flow chart showing the steps used to make our mixture for use in producing the slurry required to vacuum form articles composed mainly of ceramic fibers.

Oil free dry ceramic fibers manufactured at the Erwin, Tenn., plant of Premier Refractories and Chemicals, Inc. were chopped into particles which passed through a three-quarter inch screen. A measured quantity of the chopped ceramic fibers were then thoroughly mixed with a binder consisting of water and colloidal silica.

The resulting moist mixture contained by weight 68.9% chopped ceramic fibers, 7.5% colloidal silica and 24.2% water and lots of 40 pounds each were encased in moisture-proof bags until shipped to a company which vacuum forms fireplace logs made mainly of ceramic fibers used in gas heated fireplaces.

A number of bags containing the foregoing formulation of our moist mixture were shipped to a vacuum forming company and used in forming the slurry used to make a quantity of high quality fireplace logs. The vacuum forming company reported significant reduction in its costs of production and environmental hazards by use of our bagged moist mixture.

The foregoing formulation of the moist mixture was specially formulated for use by a vacuum former of fireplace logs. By varying the percentages of chopped fibers, binder and water; the length of the chopped fibers; the formulation of the binder; or by adding a water extending surfactant or various types of filler material, the properties of the resulting vacuum formed article may be altered as desired without departing from the scope and spirit of our invention. The scope of our invention is limited only by the appended claims.

We clam:

1. A mixture of granulated particles comprising
    ceramic fibers sized to pass through a screen having openings measuring not more than three-quarters of an inch, a binder of colloidal silica, and water, which are thoroughly mixed together to form the granulated mixture in which the ceramic fibers comprise by weight 68.3% of the mixture, the colloidal silica comprises by weight 7.5% of the mixture, and water comprises by weight 24.2% of the mixture.

2. The mixture as set forth in claim 1 in which the measured quantity of the mixture is encased in a moisture-proof bag for storage and shipping.

* * * * *